May 14, 1957 J. L. GETAZ Re. 24,314
KNITTED HOSIERY AND METHOD OF CLOSING THE TOE OF SAME
Original Filed Dec. 1, 1954
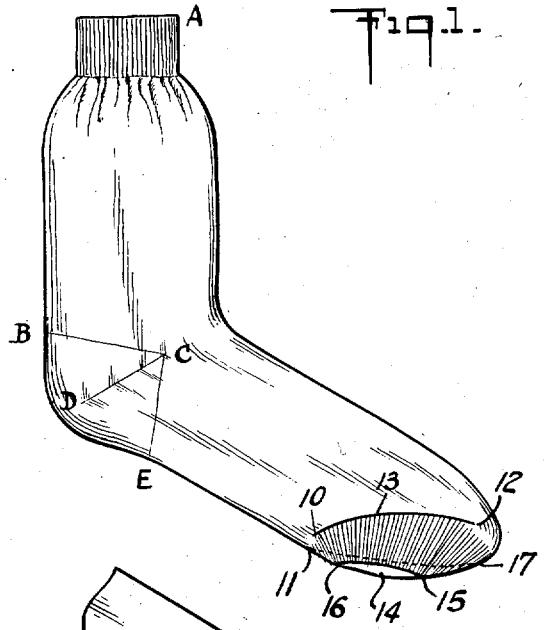
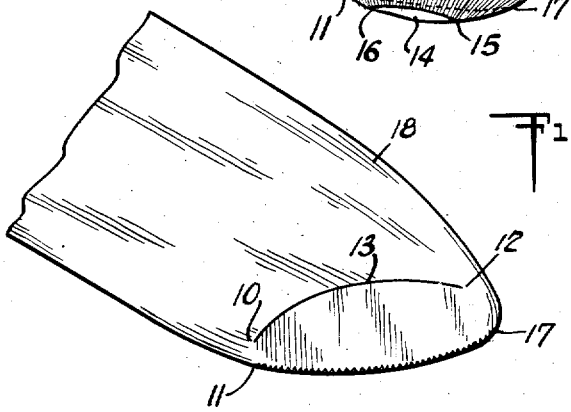
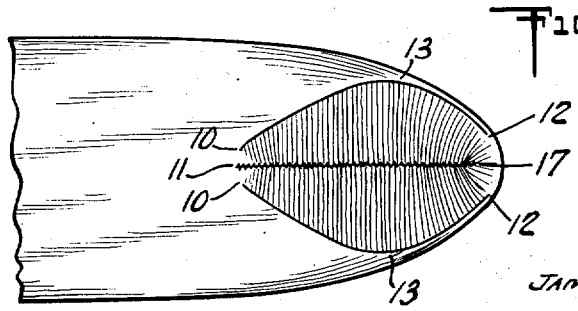
INVENTOR:
JAMES L. GETAZ.
BY
Curtis, Morris & Safford
ATTORNEYS:

United States Patent Office

Re. 24,314
Reissued May 14, 1957

24,314

KNITTED HOSIERY AND METHOD OF CLOSING THE TOE OF SAME

James L. Getaz, New York, N. Y.

Original No. 2,740,279, dated April 3, 1956, Serial No. 472,440, December 1, 1954. Application for reissue December 7, 1956, Serial No. 627,086

14 Claims. (Cl. 66—187)

Matter enclosed in heavy brackets [ ] appears in the original patent but forms no part of this reissue specification; matter printed in italics indicates the additions made by reissue.

This invention is related to knitted hosiery and particularly to a novel hosiery construction and to a method of closing the toe of hose which are knitted on circular knitting machines.

As is well known, the manufacture of hosiery is divided into two basic methods, i. e., full fashioned and circular knit. In the former the hose is knitted flat and after the knitting is completed, the two sides of the hose are folded together and the edges are sewn, with a seam which runs lengthwise of the foot and which extends to the end of the toe. *The portion of this* [This] seam *which extends along the foot* is located on the bottom of the foot where it is not visible when the hose is worn, and, although it is not a flat seam, has been found not to cause any discomfort to the wearer. It provides a quick and inexpensive method of closing the toe and is currently used for making most ladies' hose.

In the manufacture of circular knit hose, the closing of the toe, according to the method which is now in use, is more difficult. The seam instead of running lengthwise of the foot, is across the foot near the toes and is at a right angle to the length of the foot. This seam also extends halfway around the sides of the foot, and, because of its location, must be a flat seam in order to be comfortable to the wearer and acceptable to the trade. To make this seam in a satisfactory manner it is necessary for the operator to place by hand each loop at the end of the toe portion of the hose on one of the points of the dial of a looping machine. The loops of the instep portion are likewise individually placed on the same points as the loops of the foot portion and these pairs of loops are sewn together to close the toe.

This operation of putting the loops on the points of a looper dial is tedious and requires a long period of training on the part of the operator before sufficient skill can be obtained. In face, this looping of circular knit hosiery is generally agreed to be the most difficult manual operation presently involved in the commercial manufacture of hosiery.

It is the purpose of this invention to provide a circular knit hose construction wherein the seam which closes the toe, instead of running across the foot, is lengthwise and on the bottom of the foot. In this way the seam is placed in such position that it need not be a flat seam to be comfortable to the wearer, and it may be made without the tedious manual operation of putting the loops individually on the points of a looper dial.

In the accompanying drawings:

Figure 1 is a side view of the hose as it comes from the knitting machine.

Figure 2 is the side view of the toe portion of the hose after the toe has been closed.

Figure 3 is a bottom view of the toe portion of the hose as it appears on the foot of the wearer.

In the manufacture of circular knit hosiery there are two methods of rotating the cylinder which are used in the same hose. In one method, the cylinder runs continuously in one direction, generally counter-clockwise; in the other the cylinder reciprocates back and forth making less than a complete revolution in each reciprocal movement. The needles in the cylinder consist of two groups, each containing the same number of needles; those which knit the instep portion have long butts and those which knit the bottom of the foot have short butts.

In making a stocking the knitting begins at the top A (Figure 1) and continues with the cylinder rotating in one direction until the point B is reached. Then the instep needles which have long butts are raised to a height which puts them out of action, the rotation of the cylinder is changed to reciprocation and knitting proceeds to the point C on the short butt needles alone. With each reciprocal stroke, one short butt needle at either side of the the group is raised by a "pick" so that it is out of action. This process of successively raising the needles narrows the fabric and forms a gore CD. At point D, only a few needles remain in action. Then the short butt needles which have been raised are put into action one at a time and the gore is widened until the line CE is reached, whereupon the knitting of the heel will have been completed. At this point the long butt needles are brought into action and the knitting proceeds on continuous rotation during the knitting of the foot.

It is customary to knit the toe in exactly the same manner as described above for knitting the heel. There is one exception: in the manufacture of circular knit ladies' hose, the short butt needles which knit the bottom of the foot are raised out of action in the knitting of the toes and the looper seam is on the bottom of the foot to make it less noticeable, however, it runs across the bottom of the foot and shown on both sides, coming halfway up the sides of the foot.

In this invention, the procedure in knitting the toe is quite different. Instead of raising half of the needles out of action, only a few needles are raised, being those which knit the portion of the foot between the points 10 and 11 in Figure 2. The reciprocating movement begins at this point 10 and the arc of reciprocation is increased so as to knit a long course from the point 10 past the point 18 and to the point 10 on the other side of the foot. Beginning at 10 a narrowing gore 10—13—12 is formed, which is about twice as long as the usual gore, by raising one *or more needles* [needle] at a time at *either* [each] side of the group *upon each stroke of the reciprocation,* and as this gore is knitted the instep portion of the toe is formed from 18 to 12. After the narrowing side of this gore is completed, instead of widening it by putting the raised needles into action, one needle at a time, all the raised needles are put into action at once, then continuous rotation is resumed and the toe portion 13—11—14—17 is knitted. When the opening 15—16 has been reached, the hose is cast from the knitting machine and the seam 17—11 is sewn lengthwise of the foot to close the toe. The narrow piece 17—15—16—11 is cut off and discarded. The seam 17—11 is shown more clearly in Figure 3, wherein it may be seen to lie in the center of bottom of the foot of the wearer.

The method described above is preferred, but there are many variations thereof within the scope of this invention. After the gore 10—13—12 is completed, instead of putting all of the needles into action at once, they may be brought into action one *or more* at a time *on successive reciprocations of the cylinder* [or two at a time] *until all of them are back into action except the needles which knitted the portion of the foot be-*

*tween the points 10 and 11, which needles are then put back into action simultaneously.* If it is desired to shorten the seam 17—11 this may be done by incorporating a non-stretchable cord in the seam as it is sewn, or an elastic yarn may be used in the toe portion 13—11—14—17. An elastic yarn may be used at the opening 15—16 to take the curl out of the end fabric and facilitate the sewing of seam 17—11. On account of the location of seam 17—11 on the bottom of the foot it is not necessary for it to be a flat seam, but if a flat seam is desired it may be obtained by making the toe portion 13—11—14—17 of nylon and using nylon sewing thread in seam 17—11. Then the seam may be permanently flattened by pre-boarding the hose with pressure on the seam. Other variations may be developed as this method is put into volume production.

I claim:

1. A method of knitting the toe portion of hose in a circular knitting machine which comprises raising out of action a group of needles on the side of the needle cylinder which knitted the sole of the foot portion of said hose, reciprocating said cylinder while raising some of the remaining needles out of action *one or more* [a few] at a time on successive reciprocations of said cylinder, ultimately placing all of said needles back into action, and completing the knitting of the sole portion of said hose by continuous rotation of said cylinder.

2. A method of knitting the toe portion of hose in a circular knitting machine which comprises raising out of action a group of needles on the side of the needle cylinder which knitted the bottom of the foot portion of said hose, reciprocating said cylinder while raising some of the remaining needles out of action *one or more* [a few] at a time on successive reciprocation of said cylinder, placing all of said needles back into action simultaneously and completing the knitting of said hose by continuous rotation of said cylinder.

3. A method of knitting the toe portion of hose in a circular knitting machine which comprises raising out of action a first group of needles on the side of the needle cylinder which knitted the bottom of the foot portion of said hose, reciprocating said cylinder while raising a second group of needles out of action *one or more* [a few] at a time and then placing this second group of needles back into action *one or more* [a few] at a time on successive reciprocations of said cylinder, placing said first group of needles back into action simultaneously, and completing the knitting of the sole portion of said hose by continuous rotation of said cylinder.

4. A method of knitting the toe portion of hose in a circular knitting machine which comprises raising out of action a group of needles on the side of the needle cylinder which knitted the bottom of the foot portion of said hose, reciprocating said cylinder while raising some of the remaining needles out of action *one or more* [a few] at a time on successive reciprocations of said cylinder, ultimately placing all of said needles back into action, and completing the knitting of said hose by continuous rotation of said cylinder to form a marginal fabric around a toe opening of said hose, incorporating an effectively non-stretchable cord in said marginal fabric.

5. A method of knitting the toe portion of hose in a circular knitting machine which comprises raising out of action a group of needles on the side of the needle cylinder which knitted the bottom of the foot portion of said hose, reciprocating said cylinder while raising some of the remaining needles out of action *one or more* [a few] at a time on successive reciprocations of said cylinder, ultimately placing all of said needles back into action, and completing the knitting of said hose by continuous rotation of said cylinder to form a marginal fabric around a toe opening of said hose, incorporating an elastic yarn in said marginal fabric.

6. A method of forming the toe of hose using a circular knitting machine which comprises raising out of action a group of needles on the side of the needle cylinder which knitted the bottom of the foot portion of said hose, reciprocating said cylinder while raising some of the remaining needles out of action *one or more* [a few] at a time on successive reciprocations of said cylinder, utimately placing all of said needles back into action, completing the knitting of said hose by continuous rotation of said cylinder to form a marginal fabric around a toe opening of said hose, casting said hose from said needles, flattening said hose to bring its two side portions together, sewing a seam through the two side portions of said hose along a line extending longitudinally of said hose across said toe opening, and removing the marginal fabric beyond said seam.

7. A method of forming the toe of hose using a circular knitting machine, which comprises knitting two narrowing gores across the sides of said hose, knitting additional sole portions of said hose adjoining said gores, closing said toe by bringing said additional sole portions in contact with each other and sewing said additional sole portions together with a seam of stitches extending lengthwise of said hose.

8. A method of forming the toe of hose using a circular knitting machine, which comprises knitting two gores across the sides of said hose, forming the sole portion of said toe by knitting additional fabric adjoining said gores, bringing the two sides of said additional fabric in contact with each other and closing said toe by sewing said two sides of said fabric together with a seam of stitches running lengthwise of said hose.

9. A method of forming the toe of hose using a circular knitting machine, which comprises forming an instep portion of said toe by knitting gores across the sides of said hose from points near the center of the sole portion of said hose, forming said sole portion of said toe by knitting additional fabric adjoining said gores and sewing a seam of stitches which extends from a point near the end of said toe along said sole portion in a direction away from said toe to a point in the lateral center of said sole portion.

10. In circular knit hose, a toe portion having a gore extending from near the bottom center of the foot of said hose obliquely upward and forward along either side of said toe portion to a point near the toe end of said hose, said toe portion being closed by a seam of stitches extending longitudinally of the foot portion of said hose and along the bottom thereof.

11. In circular knit hose, a toe portion having a gore extending obliquely upward and forward along either side of said toe portion, said toe portion being closed by a seam of stitches extending longitudinally of the foot portion of said hose and along the bottom thereof.

12. In circular knit hose, a toe portion constructed of courses of loops of yarn, a gore in said courses, said courses on the instep side of said toe portion extending obliquely to said gore, and said courses on the bottom side of said toe portion extending generally parallel with said gore, and a seam of stitches extending longitudinally of said hose along the bottom of said toe portion to close the same.

*13. In circular knit hose, a toe portion closed by a seam of stitches extending longitudinally of said toe portion along the bottom thereof, courses adjacent said seam extending generally parallel to said seam, and courses on the top of said toe portion extending generally transversely of said toe portion.*

*14. In circular knit hose, an instep portion and a toe portion which is joined to said instep portion by knitted stitches, courses of knitted stitches in said toe portion running longitudinally of said hose, said toe portion being closed by a seam running longitudinally and along the bottom thereof.*

(References on following page)

References Cited in the file of this patent or the original patent

UNITED STATES PATENTS

| | | |
|---|---|---|
| 372,309 | Gourd | Nov. 1, 1887 |
| 1,752,587 | Butz | Apr. 1, 1930 |
| 1,789,494 | Page | Jan. 20, 1931 |
| 1,841,205 | Page et al. | Jan. 12, 1932 |
| 1,945,227 | La Montagne et al. | Jan. 30, 1934 |
| 2,130,018 | Lochhead | Sept. 13, 1938 |
| 2,384,079 | Davis | Sept. 4, 1945 |
| 2,423,744 | Whitlock | July 8, 1947 |
| 2,699,056 | Margulies | Jan. 11, 1955 |
| 2,703,972 | Reymes-Cole et al. | Mar. 15, 1955 |

FOREIGN PATENTS

| | | |
|---|---|---|
| 413,279 | Great Britain | July 10, 1934 |